A. C. GERRARD.
BUTCHER'S READY RECKONER.
APPLICATION FILED NOV. 25, 1908.

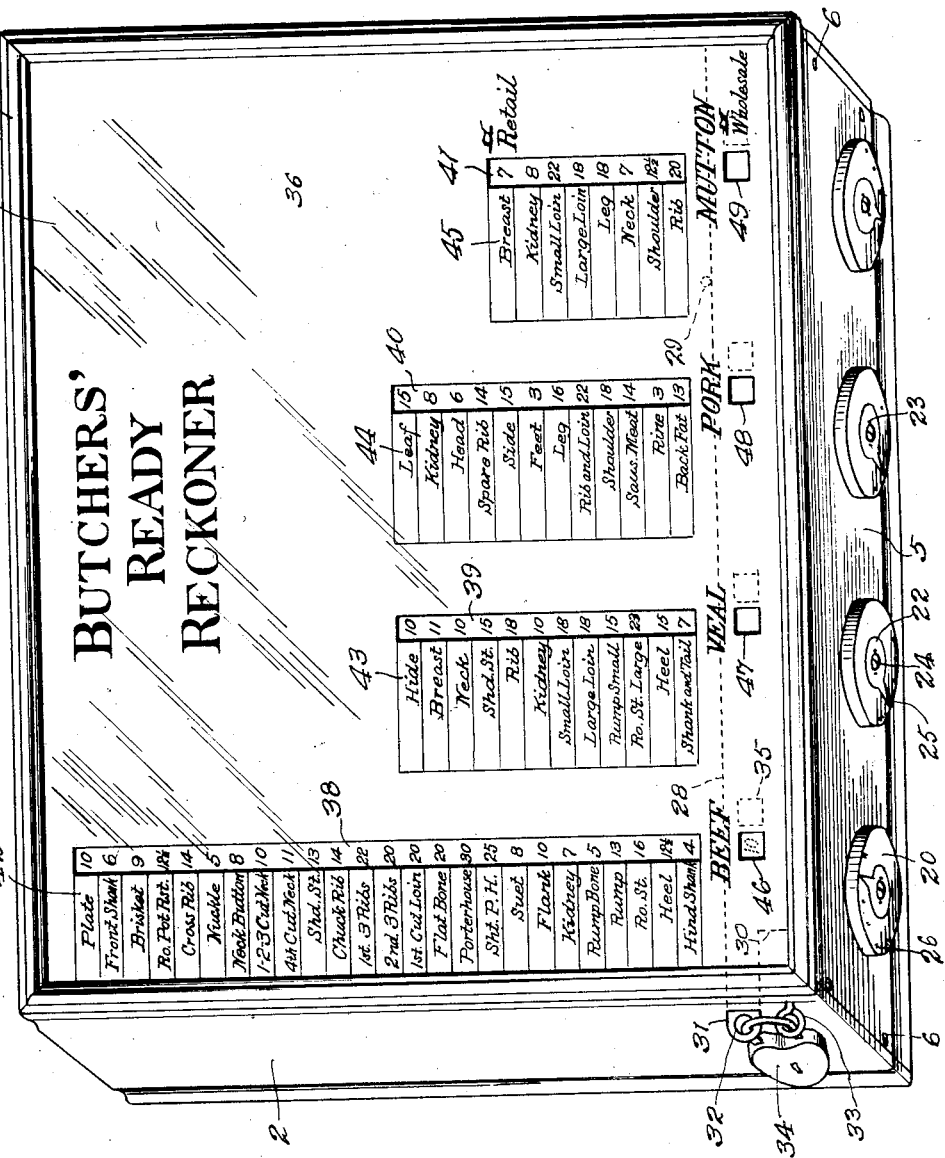

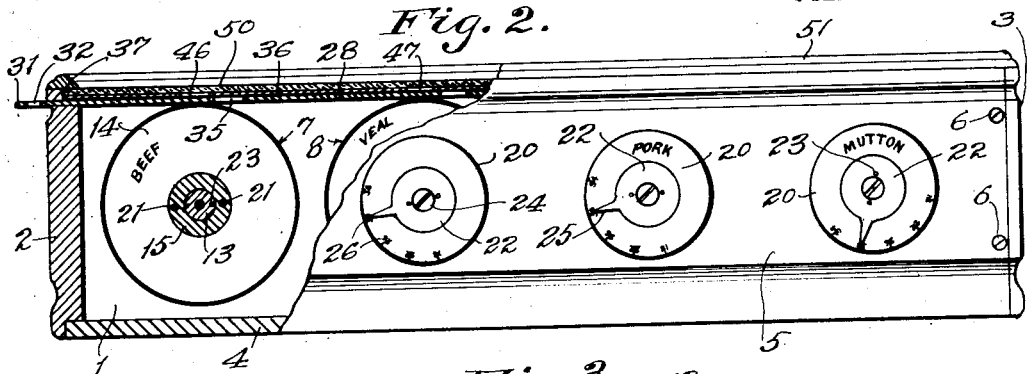
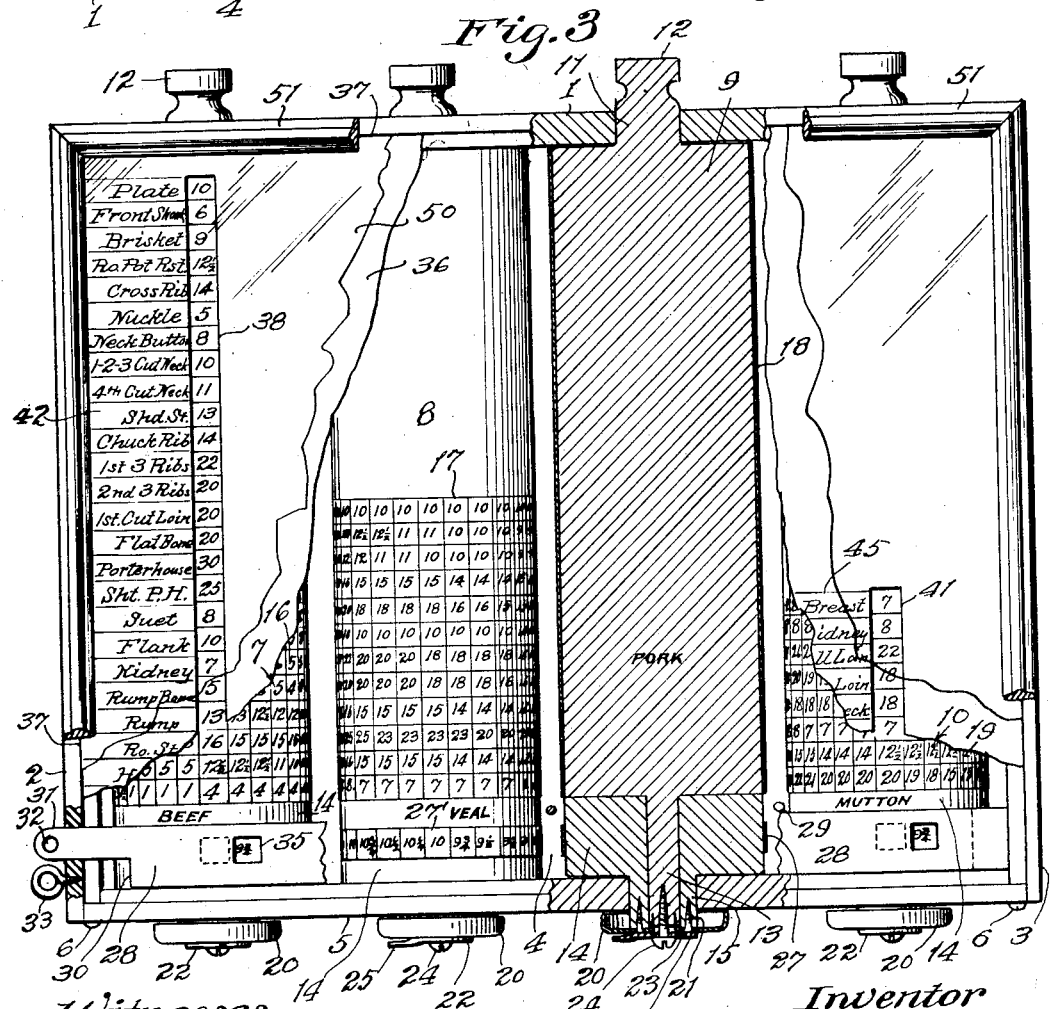

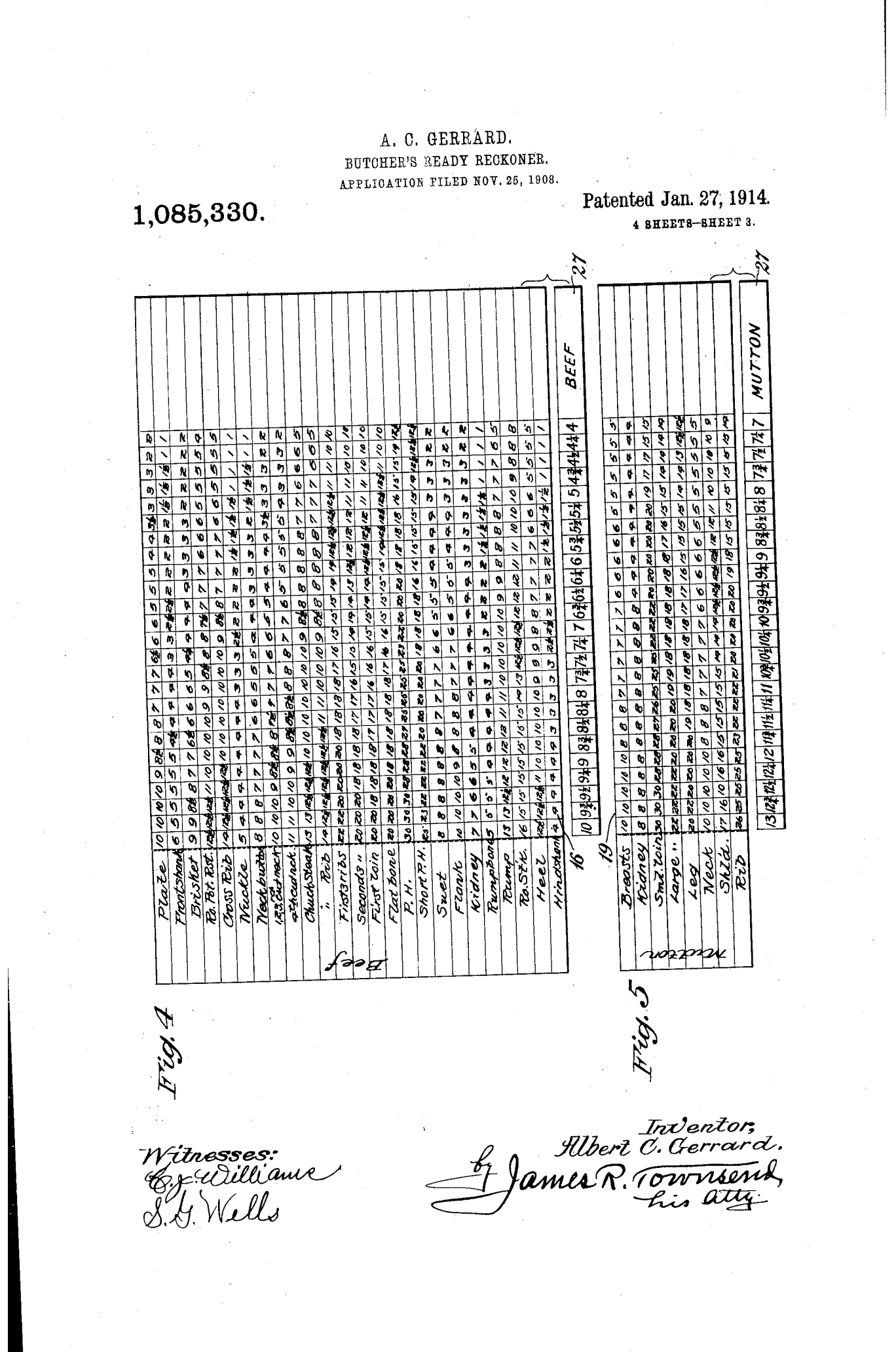

1,085,330.

Patented Jan. 27, 1914.
4 SHEETS—SHEET 3.

Fig. 4

Fig. 5

Witnesses:
E. J. Williams
S. G. Wells

Inventor,
Albert C. Gerrard.
by James R. Townsend
his atty

A. C. GERRARD.
BUTCHER'S READY RECKONER.
APPLICATION FILED NOV. 25, 1908.

1,085,330.

Patented Jan. 27, 1914.
4 SHEETS—SHEET 4.

Fig. 6.

Fig. 7.

Witnesses:
C. J. Williams
S. G. Wells.

Inventor;
Albert C. Gerrard.
James P. Townsend
his atty.

UNITED STATES PATENT OFFICE.

ALBERT C. GERRARD, OF LONGBEACH, CALIFORNIA.

BUTCHER'S READY-RECKONER.

1,085,330.  Specification of Letters Patent.  Patented Jan. 27, 1914.

Application filed November 25, 1908. Serial No. 464,484.

*To all whom it may concern:*

Be it known that I, ALBERT C. GERRARD, a citizen of the United States, residing at Longbeach, in the county of Los Angeles and State of California, have invented a new and useful Butcher's Ready-Reckoner, of which the following is a specification.

An object of this invention is to provide a table of prices for retail butchers, in the nature of a sliding scale so that when the wholesale price goes up or down all of the retail prices may be readily adjusted without computation, and so that when a butcher desires to raise or lower his percentage of profit the adjustment may be made mechanically and without computation.

The invention consists of the novel features herein shown, described and claimed.

It is to be understood that the invention is capable of various embodiments and that in practical use it is not necessary that extreme accuracy be had with regard to the prices for the reason that there is a measure of margin allowable and in actual practice quite necessary in adjusting the prices of various cuts to correspond with the wholesale prices of the half or whole carcass.

The problem is not so much to provide in each instance an exact charge per pound for each character of cut; but to provide a satisfactory scale of prices for the different cuts whereby the retailer will be safe from loss and will be assured a reasonable profit, at the same time maintaining a fair and readily determined list of prices for the different cuts.

The drawings illustrate a ready-reckoner constructed for the use of retail butchers and embodying the principles of my invention. Similar computations may be made for other classes of business without departing from the spirit of my invention.

Figure 1 is a perspective of a complete device. Fig. 2 is a front elevation partly in section. Fig. 3 is a top plan, parts being removed and parts being shown in section to illustrate the details. Fig. 4 is a plan of the computation-sheet and the wholesale price list for beef. Fig. 5 is a plan of the computation-sheet and the wholesale price list for mutton. Fig. 6 is a plan for the computation-sheet and the wholesale price list for pork. Fig. 7 is a plan for the computation sheet and the wholesale price list for veal.

The computation sheets and wholesale price lists to be used are based upon average weights found by numerous tests with different carcasses.

For a dressed side of beef weighing 261 pounds the weights of the different cuts grouped according to relative prices, are found to be as follows, and each group is found to be approximately a certain percentage of the entire side as indicated for the groups, respectively, viz: Front shank, 9¾ lbs.; knuckle 2½ lbs.; neck button 3½ lbs.; rump bone, 3¼ lbs.; hind shank 12½ lbs.; 12% of the side. Round pot roast 17½ lbs.; cross rib, 4½ lbs.; 4th cut neck 5 lbs.; rump, 11 lbs.; heel 6½ lbs.; 17% of the side. Plate 19 lbs.; brisk 6 lbs.; 1, 2, 3, cut neck, 11 lbs.; suet and fat, 3 lbs.; flank 8 lbs.; kidney 1¼ lbs.; 18% of the side. Chuck steak 22 lbs.; chuck ribs 11¾ lbs.; 14% of the side. Loin steak 9½ lbs.; flat bone 15 lbs.; 9% of the side. Porterhouse 10 lbs.; short porterhouse 10½ lbs.; 8% of the side. Round steak 35 lbs.; 13% of the side. 1st 3 ribs, 10 lbs.; 2nd 3 ribs, 12½ lbs.; 9% of the side.

For a dressed side of veal weighing 35 lbs., the cuts are as follows: Hide, 3¾ lbs.; 11% of the side. Breast 3¼ lbs.; neck 3 lbs.; 17% of the side. Shoulder steak 5½ lbs.; 16% of the side. Ribs, 2 lbs.; small loin 2¼ lbs.; large loin 3½ lbs.; 23% of the side. Rump 1 lb.; round steaks 4 lbs.; heel ½ lb.; 16% of the side. Kidney ¼ lb.; shanks and tail 5½ lbs.; 17% of the side.

For a dressed side of pork weighing 119¼ pounds, the cuts are as follows: Leaf 4½ lbs.; back fat 17 lbs.; spare ribs 3¾ lbs.; side, 14¼ lbs.; saus trim 3 lbs.; 36% of the side. Head 12¼ lbs.; rind 3 lbs.; feet 5½ lbs.; kidney, ¼ lb.; 17% of the side. Shoulder 18¾ lbs.; leg 20½ lbs.; 33% of the side. Rib and loin 16½ lbs.; 14% of the side.

For a dressed side of mutton weighing 18¼ pounds, the cuts are as follows: Breast, 3¼ lbs.; neck 1¼ lbs.; kidney 1¼ lbs.; 27% of the side. Large loin 1½ lbs.; small loin 2 lbs.; rib 1½ lbs.; 28% of the side. Leg 4¾ lbs.; 26% of the side. Shoulder 3¾ lbs.; 19% of the side.

The frame is square or rectangular and consists of the rear side piece 1 end pieces 2 and 3 framed to the rear side piece, the bottom 4 framed to the end pieces and the rear side piece, and the removable front 5 secured in place by screws 6. The beef roller 7, the veal roller 8, the pork roller 9 and the mutton roller 10 are essentially alike in mechanical details, and said rollers are mounted parallel in the frame, the rear ends of the rollers being reduced to form pintles 11 extending through bearing openings in the rear side piece and operating handles 12 extending beyond the side pieces. The forward ends of the rollers are reduced in size to form the shafts 13, and the wholesale rollers 14 are mounted rotatably upon the shafts 13. Sleeves 15 are formed integral with the forward ends of the rollers 14, said sleeves extending through the bearing-openings in the front piece 5.

The beef computation sheet 16 is placed around the beef roller 7, the veal computation sheet 17 is placed around the veal roller 8, the pork computation sheet 18 is placed around the pork roller 9, and the mutton computation sheet 19 placed around the roller 10.

The shaft 13 and sleeve 15 extend slightly beyond the front face of the front 5, and the cap-shaped dial 20 has a central opening for the end of the shaft 13 and is placed against the end of the sleeve 15 and secured thereto by screws 21 so that the dial may be used as a handle for manipulating the rollers 14. The clamping washer 22 is placed against the end of the shaft 13 and secured thereto by brads or screws 23, said washer being large enough to press the dial 20 against the sleeve 15, and an adjusting screw 24 is inserted through the center of the washer and screw-seated into the shaft 13, so that when the screw 24 is tightened the washer 22 is tightened against the dial 20 and against the end of the shaft 13 to clamp the roller 14 to the roller 7, and to clamp the parts all together. An indicator-finger 25 is formed integral with the washer and extends outwardly. A series of percentage numbers 26 are formed upon the face of the dial 20 so that by loosening the screw 24 the indicator 25 may be adjusted to point to any desired one of the numbers 26.

The wholesale price lists 27 are secured to the peripheries of the wholesale rollers, there being one roller 14 for each of the rollers 16, 17, 18 and 19. A slide 28 is placed against the inner face of the front 5 on top of the rollers 14 and is held in place by the pins 29 inserted downwardly between the rollers into the bottom 4. At one end of the slide a portion is cut away to form the shoulder 30 to engage the inner face of the side 2 and limit the movement of the slide in that direction, the other end of the slide engaging the inner face of the end 3.

A handle 31 extends from the end of the slide adjacent the shoulder 30 through a slot in the end piece 2, there being an eye 32 in the outer end of this handle and a screw-eye 33 is screw-seated in the side piece 2 from the outer side, the eye of the screw being in alinement with the eye 32 of the handle when the slide is pushed inwardly, and a padlock 34 is applied through said eyes to hold the slide in its inner or closed position.

Sight-openings 35 are formed through the slide, one for each of the rollers 14 so that the wholesale price list will present one number at a time in place to be seen through these openings. A sheet metal facing 36 is placed in a recess 37 which extends all the way around the frame in the outer edges of the walls, and sight-openings 38, 39, 40 and 41 are formed through this facing, said openings being directly over the centers of the rollers 7, 8, 9 and 10.

A printed sheet of paper is secured to the facing, the sight-openings 38, 39, 40 and 41 extending through the paper, and the list 42 appears upon the paper at the left of the opening 38; the list 43 at the left of the opening 39; the list 44 at the left of the opening 40; and the list 45 at the left of the opening 41; said list 40 being the names of the parts into which a beef-carcass is cut for retailing, the list 43 being the names of the parts into which a veal is cut, the list 44 being the names of the parts into which a pork-carcass is cut, and the list 45 being the names of the parts into which a mutton-carcass is cut. Below the list 42, 43, 44 and 45 appear the words "Beef," "Veal," "Pork," and "Mutton," and below these words appear the sight-openings 46, 47, 48 and 49 extending through the paper and the facing; said openings being directly over the centers of the wholesale rollers 14 and in alinement with the openings 35 in the slide so that by removing the padlock 34 and moving the slide to the left until the shoulder 30 strikes the end piece 2 the openings 35 will come into registration with the openings 46, 47, 48 and 49, so that the wholesale prices upon the list 27 may be seen through said openings and so that by moving the slide the other way the openings are closed and the wholesale price is covered, and by applying the padlock the slide is secured in its closed position.

In the wholesale lists 27 the numbers run by quarter cents from four to ten, and these lists applied to the different words and distinguished by the words "Beef," "Veal," "Pork," and "Mutton" upon the facing indicate the price per pound for these articles. In the computation sheets 16, 17, 18 and 19 the prices are figured to get the selling price per pound for each of the wholesale prices with a gross profit of from 18% to 34% added, or any other series of profits which may be desired; the computations being in columns so that the desired column upon the sheets upon the rollers will appear through the sight-openings 38, 39, 40 and 41.

When it is desired to adjust the machine to change the percentage of profit, the screw 24 is loosened, the dial 20 manipulated until the prevailing wholesale price appears through the corresponding opening in the facing, and then the indicator 25 is moved until it points to the desired percentage of profit in the series of numbers 26. Then the screw 24 is tightened and the desired list of retail prices appears through the sight-openings 38, 39, 40 or 41. When the wholesale price changes, all that is necessary in order to determine the corresponding retail prices, is simply to turn the dial 20 and thus turn the wholesale and retail rollers simultaneously to bring the new wholesale price to view in its sight-opening, whereupon the appropriate retail prices will appear through their sight-opening.

In constructing the device the indicator-finger 25 is fixed in alinement with the highest column of the computations upon the computation-sheet upon the retail-roller, and the percentage numbers upon the dial 20 are arranged with the highest computed percentage in alinement with the highest wholesale price upon the price-list 27, and the numbers upon the price-list run downwardly to the right while the numbers upon the dial run downwardly to the left. A glass 50 is placed upon the facing 36 and held in place by a molding 51. By removing the screws 6 the front 5 carrying the entire mechanism may be removed from the box.

It is obvious that many changes may be made in the form and size and details of construction, and that the principles may be applied to other business than butcher-business without departing from the spirit of my invention.

Thus it will be seen that I have produced a ready-reckoner comprising lists of parts, computation-sheets giving the prices of the different parts for various wholesale prices and various percentages of profit movably mounted in registration with the lists of parts, and a wholesale list of prices movably mounted relative to the computation-sheets and registering therewith, so that the device may be readily adjusted to a given wholesale price and a given percentage of profit so as to give the prices which must be charged for the various parts, thus doing away with the necessity of computing these prices or remembering the prices.

The devices may be constructed for any desired number of different percentages of profit and for any desired range of wholesale prices. For instance, in Fig. 2 I have shown five different percentages of profit ranging from 18% to 34%, and in Fig. 4 I have shown 25 different wholesale prices of beef ranging from 4¢ to 10¢ by quarter cents. In making the retail computations for beef, as in Fig. 4, the range of wholesale prices used will be selected from the wholesale list according to the range of the market and the profit percentage. For instance, when the device shown is set for computing a profit of 30% the range of wholesale prices of beef will be from 6¢ to 10¢ only, and there will be no computations for the wholesale prices below 4¢ or above 10¢. In the same way the wholesale prices of mutton may range from 7¢ to 13¢, and the wholesale prices of pork may range from 6¢ to 12¢, and the wholesale prices of veal may be entirely different from any of the other wholesale prices; so that the relation between the wholesale prices shown in Figs. 4, 5, 6 and 7, and the retail prices shown upon the various computation sheets is arbitrary. It would unnecessarily enlarge the computation sheets and complicate the device to produce five different retail prices for each of the twenty-five different wholesale prices. Of course, in exceptional cases the range of wholesale prices may go below 4¢ or above 10¢ for some materials, and the machine may be built of a larger or smaller size as desired to increase or decrease the range of wholesale prices. When finger 25 is shifted on the dial the wholesale strip is shifted relative to the retail sheet. The numbers on the dial representing percentages of profit are so arranged that when the finger is brought to one of such numbers the relation between the wholesale prices and the retail prices will correspond to the computations for that percentage. Then by tightening the screw 24 and thus fixing the finger relative to the dial and consequently the wholesale strip relative to the retail computations, the retail prices corresponding to any wholesale price at that percentage of profit for the carcass may be made available through the sight-opening.

To change the percentage the dealer will loosen the percentage screw 24 and turn the percentage dial 20, while the retail price roller is held stationary, until the indicator points to the desired percentage on the percentage dial. The slide being removed from the wholesale price sight opening, the dealer will first note that a wholesale price is in line with the retail column formerly in view, and will then tighten the percentage screw to prevent relative movement of the indicator, the percentage dial and the retail price roller. He will then turn the roller, and consequently simultaneously and equally, both price lists and the percentage dial and indicator until the prevailing wholesale price appears in the retail sight opening. For example, referring to Figs. 2, 3 and 4, if the wholesale price is ten cents per pound and the percentage of profit is 34% and the dealer has desired to change such percentage of profit to 30%, he will have rotated the price list four points to the right in Fig. 4 so that the prevailing wholesale price, 10 cents, will be found under the fourth column from the left, the prices from the top of which read downwardly 10, 5, 8, etc. If a further reduction were required to 26% when the percentage dial and the roller had again been set as above suggested, four points, the wholesale price "10" will appear under the eighth column from the left, which reads from the top downwardly, 8, 4, 6, 10, etc. A further reduction to 22% would carry the character 10 four points farther to the right underneath the column reading from the top downward 6½, 3, etc. A further reduction to 18% would bring the character 10 under the column reading from the top downward 5, 2, 4, etc. The apparatus may be set to intermediate percentages in a similar manner by gaging by the eye the appropriate distance between the numbers on the percentage dial.

In case the prevailing wholesale price should change from ten cents to five cents, the retail prices will be determined for any percentage by simply turning the roller without changing the percentage. For instance, assuming that in Fig. 4 the percentage of profit is 34 while the wholesale price is ten cents, all that is necessary in order to determine the list of prices at five cents wholesale will be to simply turn the retail price roller while the wholesale price list, percentage dial, and percentage indicator are in fixed relation to said roller. In that way the fifth column from the right of Fig. 4 would be brought to the retail price sight opening and the wholesale price "5" would appear in the wholesale price sight opening and the retail price column above it would appear in the retail sight opening, and so on with any of the different wholesale prices shown. It is evident that the same remains true with any and every percentage. For example, if the percentage has been changed from 34 to 30, the wholesale price "5" will be brought under the first retail price at the right of Fig. 4, which reads from the top downward, 2, 1, 2, 4, etc. Any further reduction of the percentage of profit with beef at five cents per pound wholesale is not at present assumed to be possible and the apparatus is not extended to show such reduction.

It is always understood that it is not necessary to apply to a dial all of the figures necessary to represent the variations which may be made to occur in position of the indicator on the dial, and the characters on the dial of this device are so spaced apart that when the dial has been shifted one point relative to the indicator the wholesale price list will have been shifted across one column of the retail price list; and when, in the instance illustrated, the dial has been turned from 30 to 34, or vice versa, four points of the retail price have been covered. By moving it only one-fourth of the distance each point of the retail price will have been covered.

The principle of the invention as above exemplified may be carried out *in extenso* by the constructor without further suggestion.

I claim:

1. In a ready-reckoner, a box, retail rollers mounted in the box, computations for retail prices upon the retail rollers, wholesale rollers adjustably connected to the retail rollers, lists of wholesale prices upon the wholesale rollers, a facing for the box and having sight-openings through which the retail prices appear and sight-openings through which the wholesale prices appear, lists of parts upon the facing registering with the retail prices upon the roller, and a slide for closing the sight-openings and hiding the wholesale prices.

2. In a ready-reckoner, retail rollers suitably mounted, computations for retail prices upon the retail rollers, wholesale rollers adjustably mounted relative to the retail rollers, lists of wholesale prices upon the wholesale rollers, percentage dials connected to the wholesale rollers, a percentage indicator connected to the retail rollers for the dial, and lists of parts in registration with the retail prices, said retail prices being figured for various wholesale prices and various percentages of profit so as to save the retailer the work of computing the prices and remembering the prices.

In testimony whereof, I have hereunto set my hand at Los Angeles, California, this 16th day of November, 1908.

ALBERT C. GERRARD.

In presence of—
 JAMES R. TOWNSEND,
 JULIA TOWNSEND.